United States Patent

Reynolds

[11] Patent Number: 6,036,850
[45] Date of Patent: Mar. 14, 2000

[54] FILTRATION SYSTEM FOR ZEBRA MUSSELS

[76] Inventor: James Clayton Reynolds, Rte. #2, Box 120, Alburg Springs, Vt. 05440

[21] Appl. No.: 09/130,029

[22] Filed: Aug. 6, 1998

[51] Int. Cl.[7] .......................... B01D 29/33; B01D 35/153
[52] U.S. Cl. .......................... 210/117; 210/338; 210/430; 210/462
[58] Field of Search .................................... 210/117, 118, 210/136, 315, 338, 416.3, 430, 457, 458, 460, 461, 462, 489, 493.1, 493.2, 497.01; 137/545, 549

[56] References Cited

U.S. PATENT DOCUMENTS

| | | | |
|---|---|---|---|
| 304,318 | 9/1884 | Hean | 210/460 |
| 1,300,653 | 4/1919 | Roper | 210/136 |
| 1,535,112 | 4/1925 | Duke et al. | 210/461 |
| 3,007,579 | 11/1961 | Pall | 210/489 |
| 5,525,222 | 6/1996 | Gleason et al. | 210/460 |

Primary Examiner—Matthew O. Savage
Attorney, Agent, or Firm—Thomas Neiman

[57] ABSTRACT

The novel filtration system for zebra mussels is comprised of an unit that is designed to allow users to prevent the infiltration of zebra mussels into drinking water systems having their intake pipes located in surface waters that are infested with the zebra mussels and their eggs. The filtration system for zebra mussels is comprised of a plurality of filters that include an inner pleated micron filter, and a middle wire frame for durability and an outer, course metallic screen. The filtration system is the form of a circular unit that is fitted around the head of a foot valve of the water intake line. A circular plate is located at the top and the bottom of the filters and is held together as a single unit with rods connecting the top and bottom circular plates. When the filtration system is together in a single unit the water drawn to the water intake foot valve is forced to pass through the filters form a five micron or less filtration unit which is designed to effectively screen out zebra mussels and their eggs.

1 Claim, 2 Drawing Sheets

FILTRATION SYSTEM FOR ZEBRA MUSSELS

BACKGROUND OF THE INVENTION

This invention pertains to water filtration systems, and, in particular, to a filtration system that is designed to prevent zebra mussels and their eggs from passing through the filtration system to a surface water system.

There are a number of devices designed to filter water systems that are on the market today. They are used in water systems, specifically surface water systems, to filter out particulate from the water. They typically are sized in terms of the size the particle they screen out in terms of microns. A fifty or twenty micron filter will clean out items that can be seen. A five or one micron unit will filter items that cannot be seen. The problem related to the zebra muscle and its eggs are the extreme proclivity of the mussel. They tend to clog simple filters very quickly and, it is also a fact that the eggs can pass through most filters and then quickly multiply and clog the water system. A number of exotic attempts have been made to fight off the explosion of the zebra muscle in water systems taking their water from lakes or ponds. Chemical and electrical treatments have been tried with various levels of success, but all are expensive or have a high level of effort required.

Clearly, it is desirable for a device of this system to be very lightweight and effective. At the same time, the device should be easy to install and be extremely simple to attach to a current water system, and at the same time be very effective. An object of this invention is to provide a system that has an ease of manufacture and ease of assembly. It is another object of this invention to teach a system that will allow the user to easily remove to clean and then re-attach to the water system.

It is an object of this invention to set forth an improved filtration system for zebra mussels which avoids the disadvantages, limitations, above-recited, obtained from previous zebra mussel restriction systems.

SUMMARY OF THE INVENTION

Particularly, it is also the object of this invention to teach a filtration system for zebra mussels for use in order to prevent the penetration of zebra mussels and their eggs from entering into surface drinking water systems, comprising a frame; said frame comprising a top plate; said frame further comprising a base plate; said frame further comprising connection means for holding said top plate and said base plate in a single assembly; a plurality of filtration units imposed between said top plate and said base plate for insuring that the water entering the surface drinking water system passes through said plurality of filtration units; and a plumbing entry system connected to the plumbing line and inserted into said filtration system for taking the water after it has gone through said filtration system.

BRIEF DESCRIPTION OF THE DRAWINGS

Further objects and features of this invention will become more apparent by reference to the following description taken in conjunction with the accompanying figure, in which.

DETAILED DESCRIPTION OF THE PREFERRED EMBODIMENT

Figure 1:
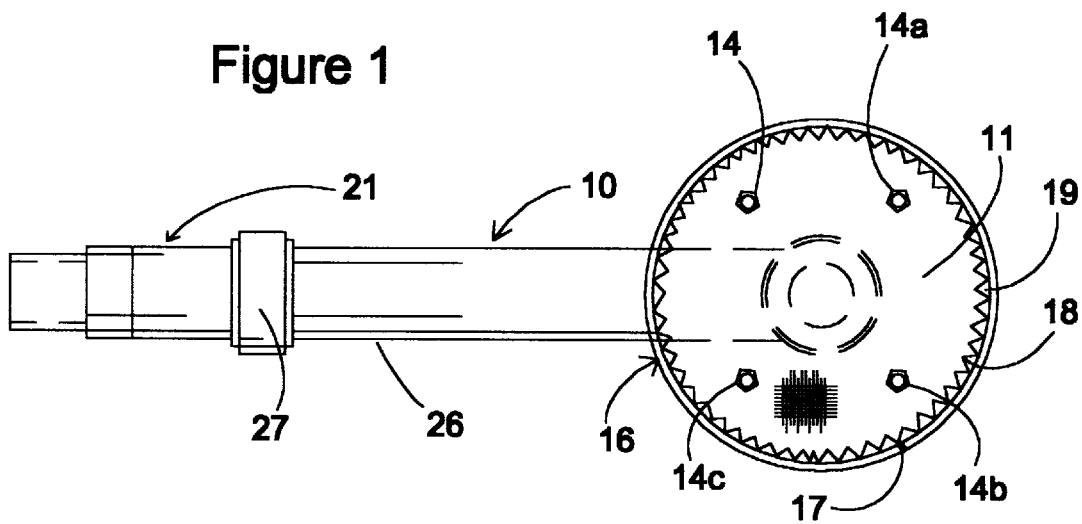
FIG. 1 is a top plan view of the novel filtration system for zebra mussels.
Figure 2:
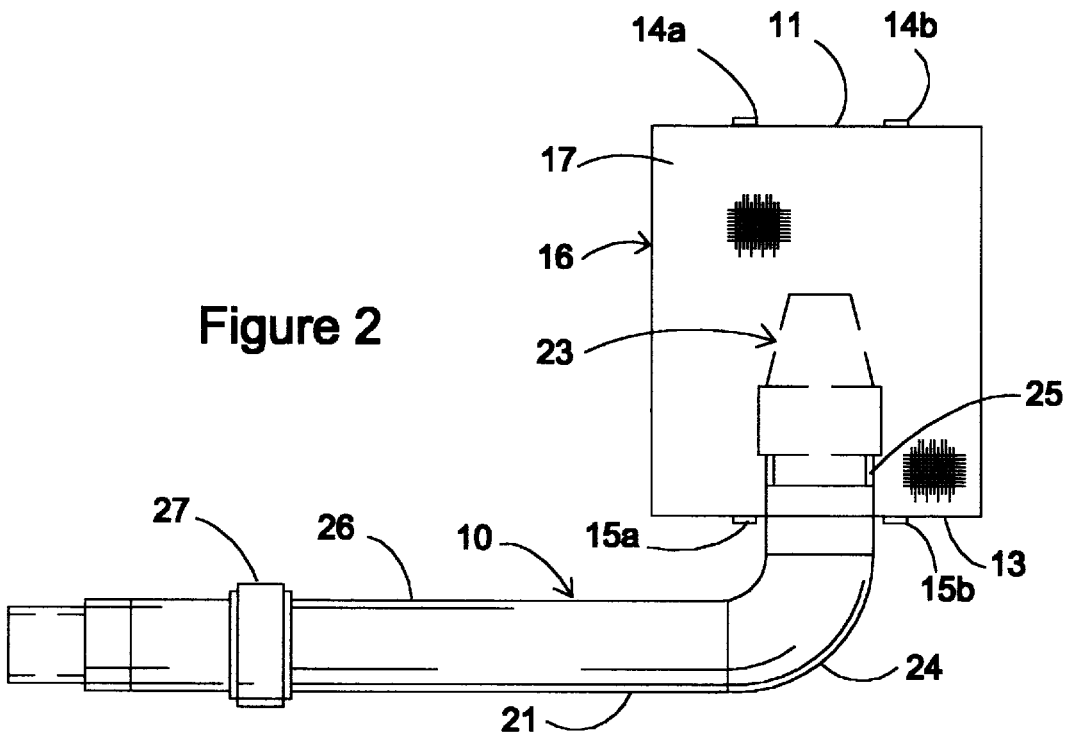
FIG. 2 is a side elevational view thereof.
Figure 3:
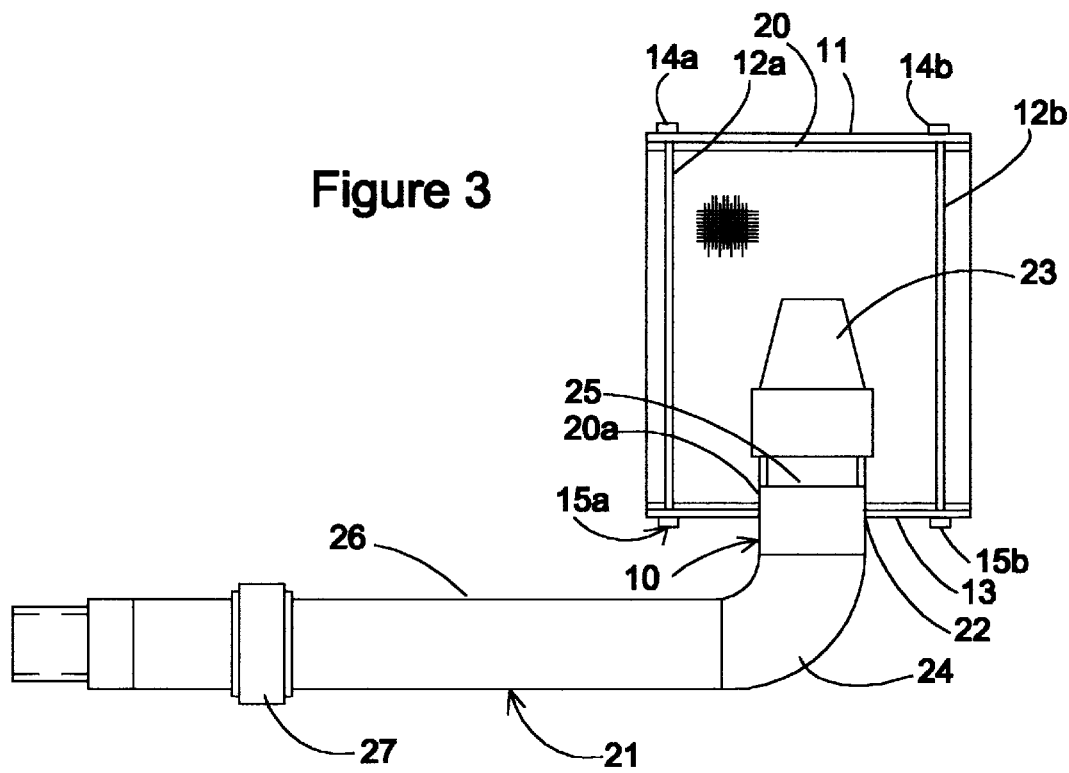
FIG. 3 is a cross sectional view thereof.

As shown in the figures, the novel filtration system for zebra mussels 10 is comprised of a top plate 11 which is comprised of a circular rigid plate made of metal or plastic. The top plate 11 is connected by a plurality of rods 12, 12a, 12b and 12c to a base plate 13, which is also a circular rigid plate made of plastic or metal. The rods 12 through 12c are held in position by means of nuts 14 through 14c and 15 through 15c attached to the rods 12 through 12c through small apertures in the top and base plates. The use of copper or brass as a metal is designed to minimize the attachment of the zebra mussels and their eggs from adhering to the filtration system or piping.

A combination filtration unit 16 which is comprised of two circular filters positioned on the outside of the connection rods and between the top plate 11 and the base plate 13. The combination filter unit 16 is comprised of an outer circular course filter 17 that is constructed of a copper material is designed to screen out large items. The inner filter 18 is a corrugated, circular mesh of five microns or less which is constructed of a non corrosive metallic material such as copper and is designed to remove fine particles including the zebra muscle and its eggs. The middle frame 19 is a wire frame which helps hold the filtration system 16. A seal 20 and 20a at the junctions of the filtration unit 16 and the top plate 11 and the base plate 13. This seal can be epoxy, or a vinyl glazing, or a non toxic glue, or the like, and insures the water entering the drinking water system passes through the filtration unit 16.

A plumbing entry unit 21 takes the filtered water and transports it into the drinking water system. It is a unit that enters the filtration system 10 through an aperture 22 in the base plate 13. It is comprised of a foot valve 23 connected to a ninety degree elbow 24 by means of a soldered or threaded union 25 that is soldered into position. The elbow 24 is connected to a length of tubing or pipe 26 that contains a coupling 27 positioned along its length for ease of removal or replacement. The length of pipe or tubing 26 has a soldered or threaded adapter at the end away from the elbow 24 that is designed to be connected to the drinking water system.

For installation, the plumbing entry unit would be positioned first. Once the plumbing entry unit is in position the base plate is soldered or threaded to a fitting on the foot valve. The filtration unit is then positioned over the foot valve and then set onto a seal that is positioned around the edges of the base plate and the filtration unit is secured in place with a sealing agent, such as a non-toxic glue. The top end of the filtration unit is positioned with the top plate and sealed in the same fashion. the connection rods are then put through the apertures in the top plate and then locked into position by threading the rods into the nuts which creates a single assembly for the filtration system.

While I have described my invention in connection with specific embodiments thereof, it is clearly to be understood that this is done only by way of example and not as a limitation to the scope of my invention as set forth in the objects thereof and in the appended claims.

I claim:

1. A filtration system for zebra mussels, for use in order to prevent the penetration of zebra mussels and their eggs from entering into surface water systems, comprising:

a frame;

said frame comprising top plate;

said frame further comprising a base plate;

said base plate having an aperture positioned therein;

said frame further comprising connection means for holding said top plate and said base plate in a single assembly;

a plurality of filtration units imposed between said top plate and said base plate for insuring that the water entering the surface water system passes through said plurality of filtration units;

a plumbing entry unit connected to the plumbing line and inserted into said filtration system for taking the water after it has gone through said filtration system;

said plumbing entry unit comprises a length of tubing;

said length of tubing having a coupling soldered at a point along the length for allowing the ease of removal of the plumbing entry unit as necessary;

said plumbing entry unit further having an elbow of approximately ninety degree connected to an end of said length of tubing and positioned beneath said aperture in said base plate;

said elbow having a threaded connector attached thereto; and said threaded connector having a foot valve attached thereto, said foot valve positioned within said filtration system inside of said plurality of filtration units for receiving said water after it has passed through said plurality of filtration units.

* * * * *